United States Patent
Shen

(10) Patent No.: US 12,099,284 B2
(45) Date of Patent: Sep. 24, 2024

(54) FOLDABLE LIGHT REFLECTIVE DEVICE FOR PHOTOFLOOD LAMP

(71) Applicant: SHAOXING SHANGYU LIFEI PHOTOGRAPHIC EQUIPMENT CO., LTD, Zhejiang (CN)

(72) Inventor: Lifei Shen, Zhejiang (CN)

(73) Assignee: SHAOXING SHANGYU LIFEI PHOTOGRAPHIC EQUIPMENT CO., LTD, Shaoxing (CN)

(*) Notice: Subject to any disclaimer, the term of this patent is extended or adjusted under 35 U.S.C. 154(b) by 0 days.

(21) Appl. No.: 18/221,376

(22) Filed: Jul. 12, 2023

(65) Prior Publication Data

US 2024/0219814 A1    Jul. 4, 2024

Related U.S. Application Data

(63) Continuation of application No. PCT/CN2021/079521, filed on Mar. 8, 2021.

(30) Foreign Application Priority Data

Jan. 13, 2021   (CN) .......................... 202110040463.0

(51) Int. Cl.
*G03B 15/06* (2021.01)

(52) U.S. Cl.
CPC .................. *G03B 15/06* (2013.01)

(58) Field of Classification Search
CPC ..................................................... G03B 15/06
See application file for complete search history.

(56) References Cited

U.S. PATENT DOCUMENTS

| 10,268,105 B1* | 4/2019 | Zhu ........................ F21V 7/0008 |
| 11,366,371 B2* | 6/2022 | Yoo ......................... G03B 15/06 |
| 11,719,999 B1* | 8/2023 | Chen ....................... G03B 15/06 |
| | | 362/16 |

(Continued)

FOREIGN PATENT DOCUMENTS

| CN | 210005840 U | 1/2020 |
| CN | 214252841 U | 9/2021 |

OTHER PUBLICATIONS

English translation of Chen CN 210005840, published Aug. 2019 (Year: 2019).*

(Continued)

*Primary Examiner* — Evan P Dzierzynski

(57) ABSTRACT

A foldable light reflective device (100) for photoflood lamp includes a chuck (10) and a plurality of support rods (20) for mounting a reflective cloth (40). The support rods (20) are arranged along a circumference of the chuck (10) and hinged to the chuck (10), and each support rod (20) has relative unfolded and folded states. A locking mechanism (30) for holding the support rod (20) in the unfolded state is provided between each support rod (20) and the chuck (10). Each locking mechanism (30) includes a swinging member (31) with a middle portion hinged to the chuck (10) and being divided, at a hinge point, into an operation part (311) and a co-operation part (312), the co-operation part (312) of the swinging member (31) having two states of locking and releasing the support rod (20); and a retaining member for restraining the swinging member (31) in the locking state.

18 Claims, 7 Drawing Sheets

(56) References Cited

U.S. PATENT DOCUMENTS

2019/0049091 A1* 2/2019 Park .......................... F21V 1/06
2019/0377242 A1* 12/2019 Boerup .................. G03B 15/06
2021/0141288 A1* 5/2021 Karle ..................... G03B 15/06
2021/0382374 A1* 12/2021 Yoo ........................ G03B 15/02

OTHER PUBLICATIONS

Office Action Dated Jul. 18, 2024 for Corresponding Chinese Application No. 202110040463.0.

\* cited by examiner

FOLDABLE LIGHT REFLECTIVE DEVICE FOR PHOTOFLOOD LAMP

TECHNICAL FIELD

The present application relates to the technical field of photoflood lamps, in particular to a foldable light reflective device for photoflood lamp.

BACKGROUND

When taking photos indoors, in order to ensure sufficient brightness of the light of the photoflood lamp, a softbox is usually installed on the photoflood lamp, wherein the light of the photoflood lamp is adjusted by the softbox.

The existing softbox includes a support frame, a reflective cloth and a plurality of support strips. The support frame is installed on the photoflood lamp, the support strips are arranged along a circumferential direction of the support frame and installed on the support frame, and the reflective cloth is installed on the support strips. In order to enable the softbox to be foldable, a locking mechanism is provided between the support strip and the support frame. The support strip is locked to or unlocked from the support frame through the locking mechanism, thereby enabling the softbox to be folded or unfolded.

The locking mechanism includes a spring chamber provided in a chuck, a sliding key, and a spring installed in the spring chamber. The sliding key is provided with a locking buckle and a toggle button, the spring chamber is provided with a sliding groove extending therethrough, and the sliding key is inserted into the spring chamber and connected to the spring. The sliding key is inserted into the spring chamber after extending through the sliding groove, and pressed tightly by the spring, so that the locking buckle on the sliding key maintains a state that extends beyond a support rod locking mechanism, which limits a downward movement position of an elastic support rod.

However, the above locking mechanism has too many components, and the components need to cooperate with each other in use, which not only increases the difficulty of assembly of the components, but also easily causes damage to the locking mechanism.

SUMMARY OF THE INVENTION

Technical Problem

In order to solve the above technical problems, the present application provides a foldable light reflective device for photoflood lamp, which can reduce a difficulty of assembly of the locking mechanism and prolong the service life of the light reflective device.

Technical Solution

The present application provides a foldable light reflective device for photoflood lamp, including a chuck with a through hole defined in a central portion thereof, a plurality of support rods radially distributed around the chuck and a reflective cloth lined on the plurality of support rods; each of the plurality of support rods having one end being hinged with the chuck, and having an unfolded state to support the reflective cloth to form a cover structure and a folded state; a locking mechanism being provided between each of the plurality of support rods and the chuck for maintaining the support rod in the unfolded state, wherein the locking mechanism includes:

a swinging member hinged with the chuck at a middle portion thereof, the swinging member being divided into an operation part and a co-operation part at a hinge point thereof, the co-operation part of the swinging member having a state of locking the support rod and a state of releasing the support rod; and a retaining member being configured for restricting the swinging member in the locking state.

Some optional embodiments are provided below, which are not an additional limitation to the above technical solution, and just further supplements or optimizations to the above technical solution. Without technical or logical contradictions, each optional embodiment may be combined to the above technical solution separately, or it may be combined among the optional embodiments.

Optionally, the support rod includes a hinged end and a free end, a mounting groove is defined in an outer periphery of chuck and matches with the hinged end of the support rod, the co-operation part of the swinging member extends into the mounting groove to lock the support rod, and the operation part protrudes out from the chuck.

Optionally, the co-operation part of the swinging member is provided with an open slot for avoiding the support rod, and thus forms two locking arms for locking the support rod, wherein the locking arms are matched with a side wall of the mounting groove and a side face of the support rod in clearance fit.

Optionally, the support rod has a locking block protruding out from each lateral side thereof, and each locking arm bends inwardly to form a locking hook that matches with the locking block.

Optionally, the locking block and the locking hook are respectively provided with a first locking surface and a second locking surface that contact with each other in a locking state, as well as a first arc transition surface and a second arc transition surface that connect the first locking surface and the second locking surface, respectively.

Optionally, a line connecting a contact point between the locking hook and locking block and a hinge point of the support rod is perpendicular to the hinge end of the support rod.

Optionally, the chuck includes a main body and a cover body, the mounting groove is formed at an outer periphery of the main body with two open sides, and the cover body is configured to seal one of the two open sides of the mounting groove.

Optionally, the operation part of the swinging member extends obliquely towards a geometric center of the swinging member along a radial direction of the chuck.

Optionally, the retaining member is a torsion spring.

Optionally, the support rod includes a connecting seat hinged with the chuck and a rod body; one end of the rod body is connected to the connecting seat by plug-in fit, and another end of the rod body extends along a direction away from the chuck; and the co-operation part of the swinging member cooperates with the connecting seat to lock the support rod.

Optionally, the connecting seat is provided with a first shaft; and the chuck includes a main body and a cover body, wherein the cover body and the main body are connected to each other by snap-fit and cooperatively defines a first slot matching with the first shaft.

Optionally, the swinging member is provided with a second shaft; and the chuck includes a main body and a cover body, wherein the cover body and the main body are connected to each other by snap-fit and cooperatively defines a second slot matching with the second shaft.

Optionally, two opposite sides of the connecting seat are provided with mating planes.

Optionally, further including a Bowens-mount through which the light reflective device is connected to the photoflood lamp.

Optionally, the chuck is provided with a positioning step, and an outer edge of the Bowens-mount is placed on the positioning step.

Beneficial Effects

For the foldable light reflective device for photoflood lamp of the present application, the locking mechanism is simple in structure, which can reduce the difficulty of assembly of its components and prolong its service life.

Figure 1:
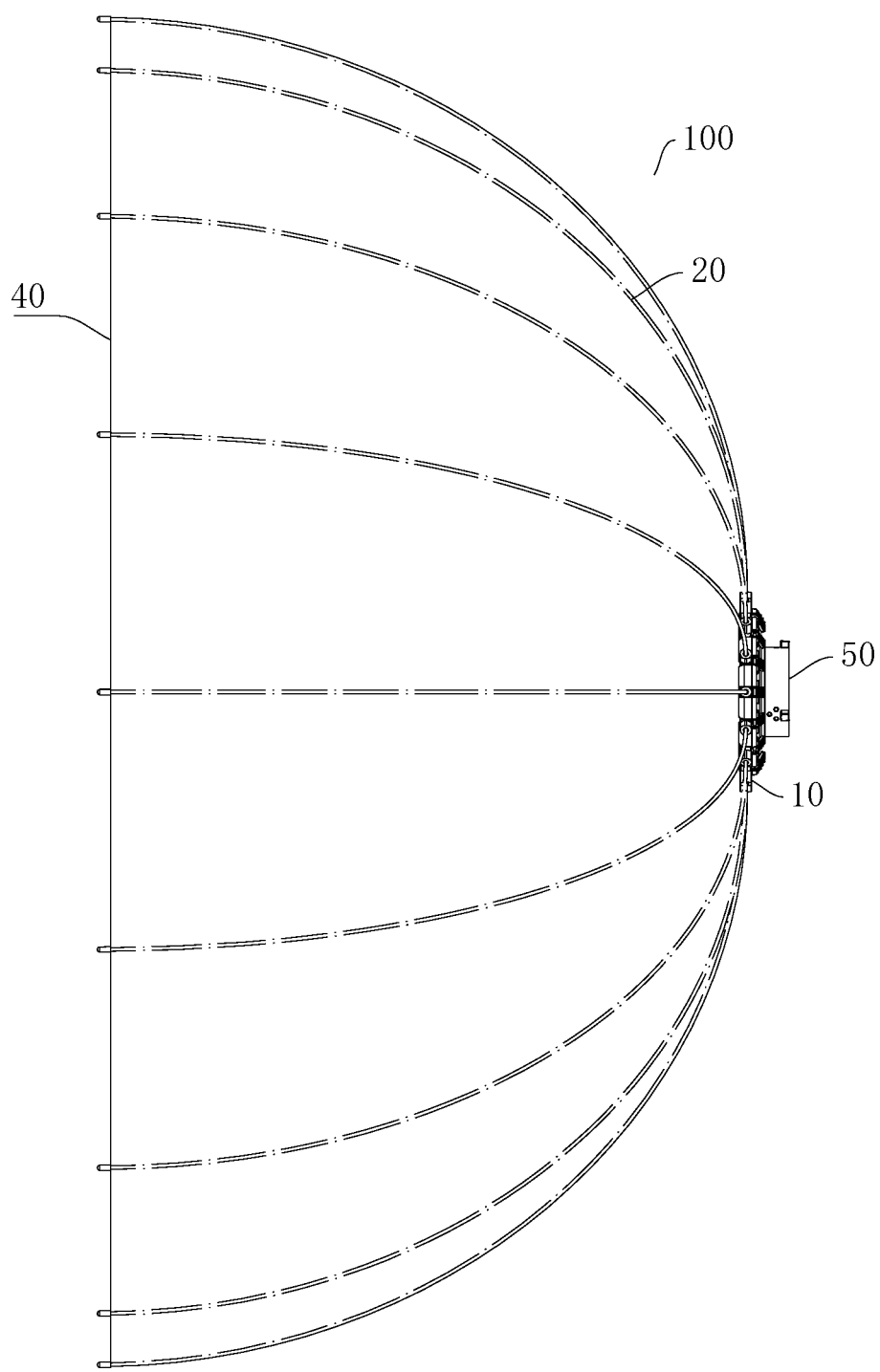
FIG. 1 is a schematic view of a foldable light reflective device for photoflood lamp provided by an embodiment of the present application.

In the drawings, the reference signs represent:
100, light reflective device;
10, chuck; 11, main body; 12, cover body; 13, positioning step; 14, through hole; 15, mounting groove; 16, first slot; 17, second slot;
20, support rod; 21, hinged end; 22, free end; 23, connecting seat; 231, inserting hole; 24, rod body; 25, locking block; 251, first locking surface; 252, first arc transition surface; 26, first shaft;
30, locking mechanism; 31, swinging member; 311, operation part; 312, co-operation part; 315, locking arm; 316, locking hook; 317, open slot; 318, second locking surface; 319, second arc transition surface; 32, second shaft;
40, reflective cloth;
50, Bowens-mount.

DESCRIPTION OF THE EMBODIMENTS

Technical solutions in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when a component is said to be "connected" to another component, it may be directly connected to another component, or indirectly connected to another component through one or multiple intermediate components; and when a component is said to be "arranged/set/mounted/installed" on another component, it may be directly arranged/set/mounted/installed on another component, or indirectly arranged/set/mounted/installed on another component through one or multiple intermediate components.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application. The term "and/or" used in the specification includes any and all combinations of one or more related listed items.

As shown in FIG. 1 to FIG. 5, the present application provides a foldable light reflective device 100 for photoflood lamp, which includes a chuck 10, a plurality of support rods 20 radially distributed around the chuck 10, and a reflective cloth 40 lined on the support rods 20. One end of each of the support rods 20 is hinged with the chuck 10. The support rod 20 has an unfolded state that supports the reflective cloth 40 to form a cover structure and a folded state.

The chuck 10 is installed on a lamp holder of the photoflood lamp, and a through hole 14 is defined at a central portion of the chuck 10 corresponding to the lamp holder. A size of the through hole 14 is set according to specific needs of the lamp holder. Unfolding and folding of the support rods 20 can correspondingly drive the reflective cloth 40 to unfold and fold. A number of the support rods 20 may be selected according to actual needs, so that the light reflective device 100 has different shapes, such as quadrilateral, octagonal, etc.

The support rods 20 may be internally or externally penetrated relative to the reflective cloth 40. Internal penetration means that the support rods 20 are located at an inner side of the cover structure, and external penetration means that the support rods 20 are located at an outer side of the cover structure. Generally, the support rods 20 are fixed by penetrating into collars which are arranged along a radial direction of the reflective cloth 40.

The light reflective device 100 may be either a softbox or a radome. An opening of the cover structure of the softbox is usually equipped with a scrim, which is usually connected to an inner wall of the cover structure by thread gluing.

In order to maintain the support rods 20 in the unfolded state, a locking mechanism 30 is provided between each of the support rods 20 and the chuck 10. Specifically, each locking mechanism 30 includes a swinging member 31 and a retaining member (not shown). A middle portion of the swinging member 31 is hinged to the chuck 10, and the swinging member 31 is divided into an operation part 311 and a co-operation part 312 at a hinged joint thereof. The co-operation part 312 of the swinging member 31 has a state of locking the support rod and a state of releasing the support rod 20. The retaining member is configured for restricting the swinging member 31 in the locking state.

When the swinging member 31 in the locking state, the retaining member restricts the swinging member 31 in the locking state. In this situation, the light reflective device 100 is in the unfolded state. The swinging member 31 overcomes a resistance of the retaining member and is in the releasing state. By means of rotating the support rods 20, all of the support rods 20 are folded to make the light reflective device 100 in the folded state. When the support rods 20 switches from the unfolded state to the folded state, the operation part 311 of the swinging member 31 is controlled to drive the co-operation part 312 to move until the co-operation part 312 switches to the releasing state. At this time, the support rod 20 may be folded, that is, the support rod 20 can rotate around the chuck 10 to change a position thereof relative to the chuck 10.

In this application, the locking mechanism 30 is simple in structure, which can reduce the difficulty of assembly of its components, and prolong its service life, and the operation is more convenient.

In some embodiments, the retaining member is a torsion spring, which is mounted around a rotary shaft of the swinging member 31 and acts between the swinging member 31 and the chuck 10. Of course, in other embodiments, the retaining member may also be a compression spring or other reset member, as long as the retaining member can drive the co-operation part 312 of the swing member 31 and the support rod 20 to be in the locking state.

Figure 5:
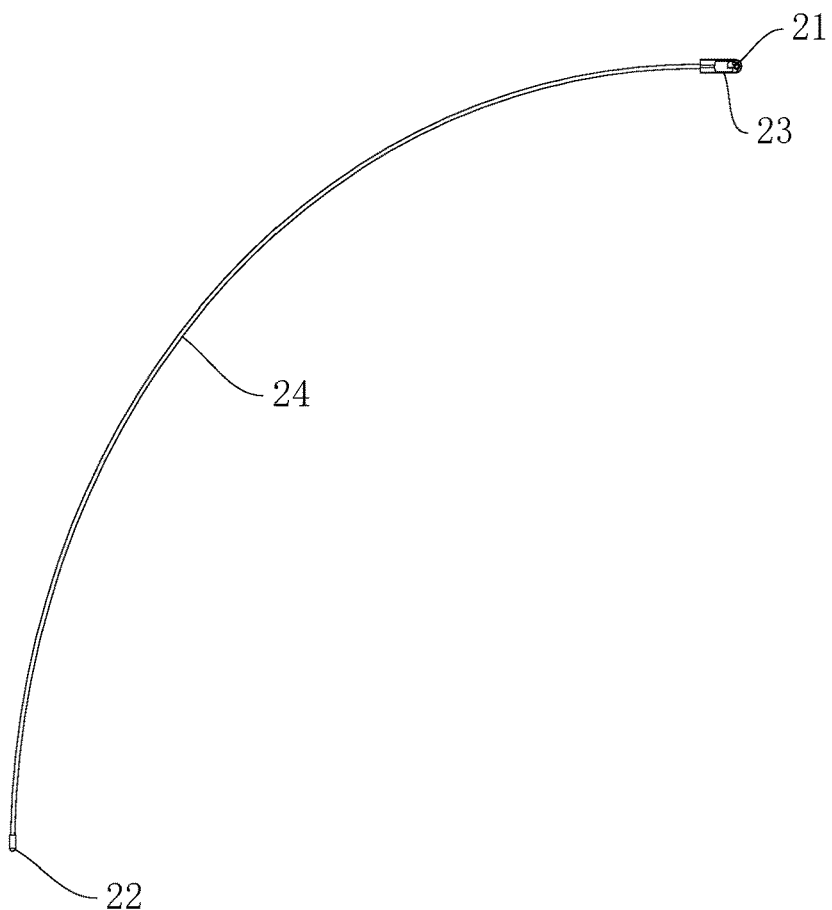
FIG. 5 is a schematic view of a support rod of FIG. 1.

In some embodiments, as shown in FIG. 1 and FIG. 5, each support rod 20 includes a hinged end 21 and a free end 22. A mounting groove 15 is defined at an outer periphery of the chuck 10 and matches with the hinged end 21 of the support rod 20, so as to avoid exposing the hinged end 21 of the support rod 20. The support rod 20 is allowed to rotate only in a single direction, and thus the mounting groove 15 is open at a single side.

Figure 6:
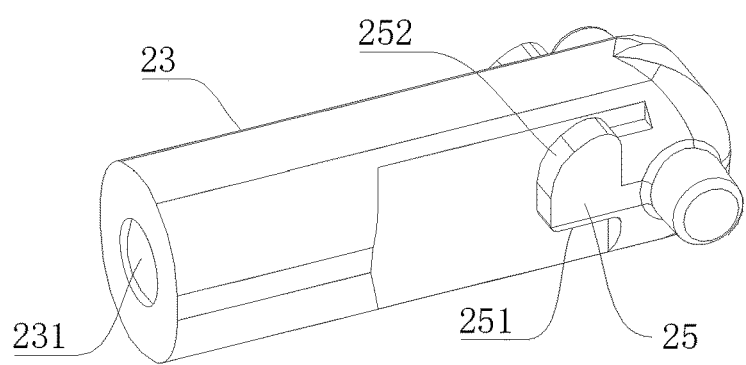
FIG. 6 is a schematic view of the chuck of FIG. 4.

A specific configuration of the support rod 20 may refer to one of the embodiments. As shown in FIG. 5 and FIG. 6, the support rod 20 includes a connecting seat 23 hinged with the chuck 10 and a rod body 24. One end of the rod body 24 is connected to the connecting seat 23 by plug-in fit, and another end of the rod body 24 extends along a direction away from the chuck 10. In some embodiments, the rod body 24 is made of metal material and has a certain degree of elasticity.

A connecting manner between the rod body 24 and the connecting seat 23 refers to one of the embodiments, which may be detachable connection by plug-in fit. Specifically, the connecting seat 23 defines an inserting hole 231 therein, and the rod body 24 may be inserted into the inserting hole 231. In some embodiments, in order to fix the rod body 24 in the inserting hole 231, the rod body 24 and the inserting hole 231 are connected by an interference fit. Of course, in other embodiments, rivets may be provided between the rod body 24 and the connecting seat 23 to fix the rod body 24 in the inserting hole 231.

Figure 2:
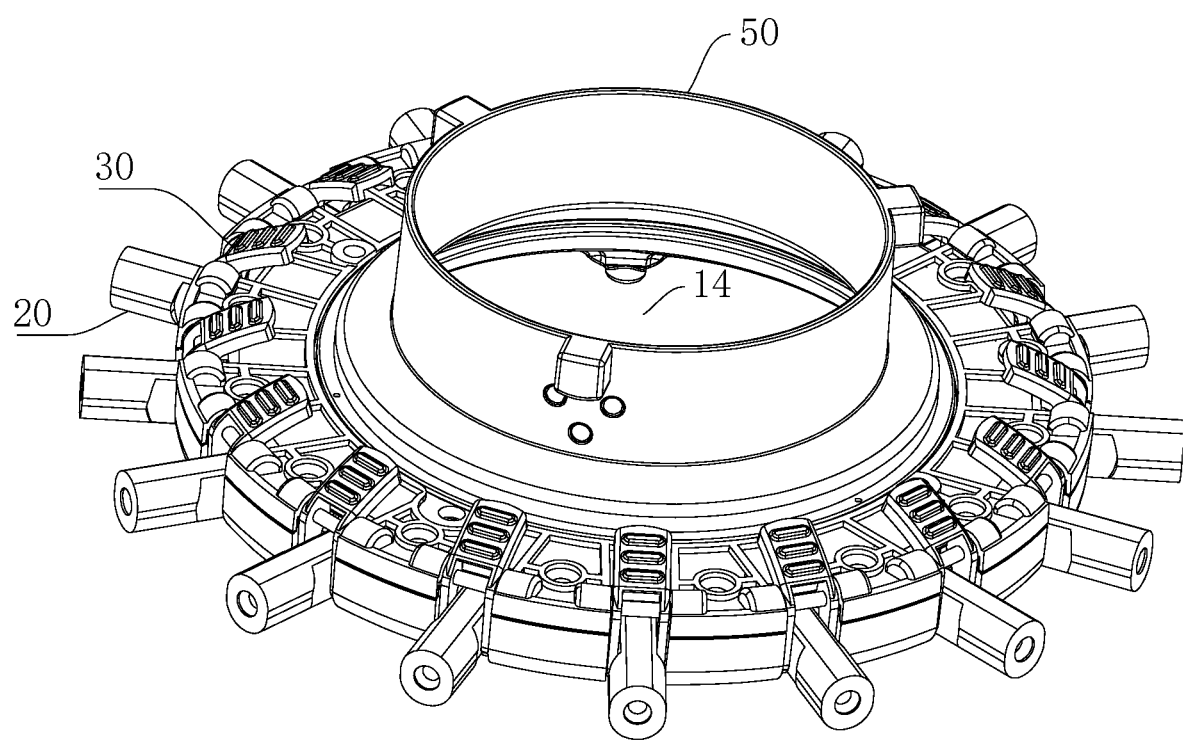
FIG. 2 is a schematic view of a light reflective device in FIG. 1, wherein rod bodies are removed.
Figure 3:
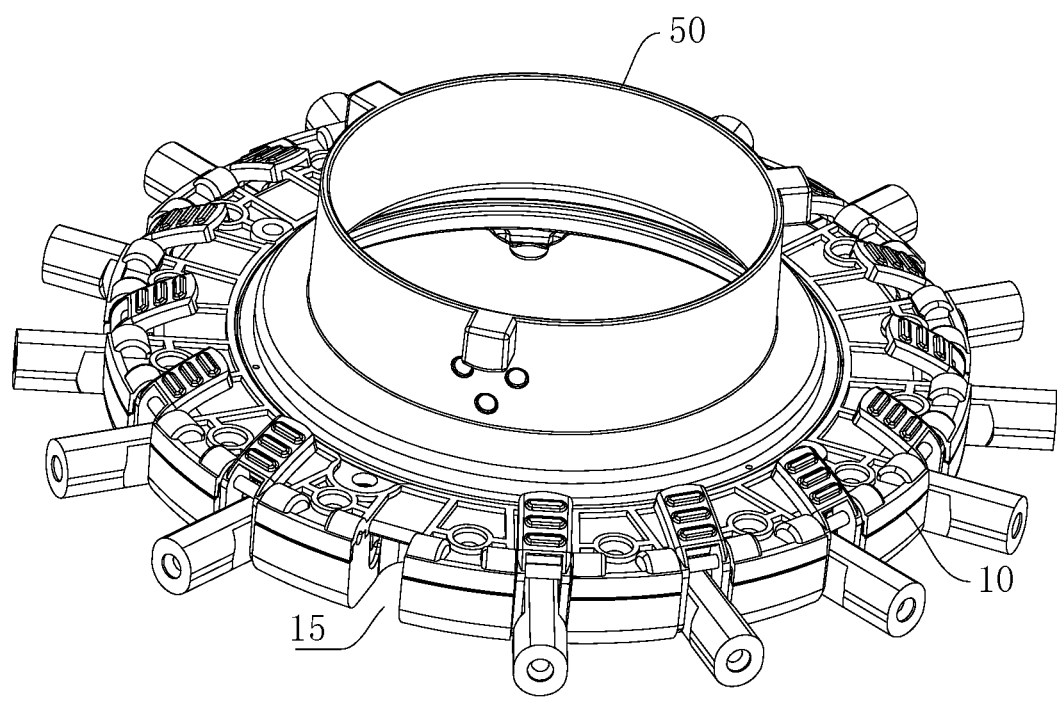
FIG. 3 is a schematic view of the structure of FIG. 2, wherein one locking mechanism is removed.

In this embodiment, as shown in FIG. 2 and FIG. 3, the co-operation part 312 of the swinging member 31 extends into the mounting groove 15 to lock the support rod 20, so as to avoid exposing a mating position between the co-operation part 312 of the swinging member 31 and the support rod 20. At the same time, the operation part 311 protrudes out from the chuck 10, so as to facilitate an operation of the operation part 311 by the operator.

The operation part 311 of the swinging part 31 extends obliquely towards a geometric center of the swinging member 311 along a radial direction of the chuck 10, and thus an angle is formed between the operation part 311 and the co-operation part 312. When the light reflective device needs to be folded, the co-operation part 312 will lift upwardly by pressing the operation part 311, thereby achieving releasing of the support rod 20. The operation section 311 is further provided with anti-skid grains, which can increase a friction force of the operator's hand.

In some embodiments, in order to enhance a strength of the swinging member 31 and reduce a processing difficulty of the swinging member 31, the swinging member 31 is formed integrally as one piece. Of course, in other embodiments, the swinging member 31 may also be formed in split-type.

Figure 4:
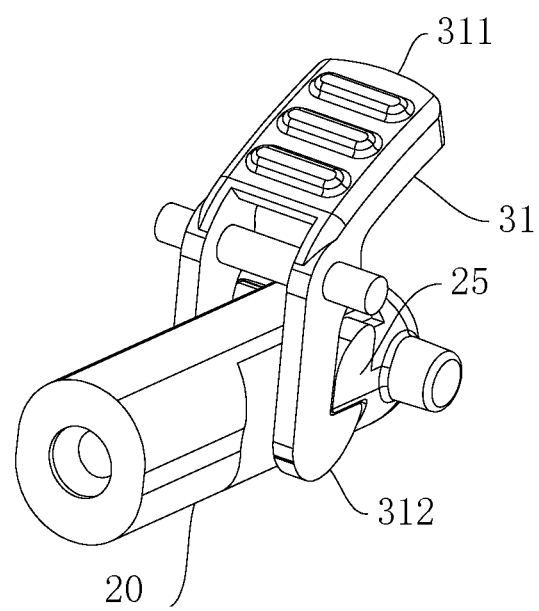
FIG. 4 is a schematic, assembled view of the locking mechanism and chuck of FIG. 2.
Figure 7:
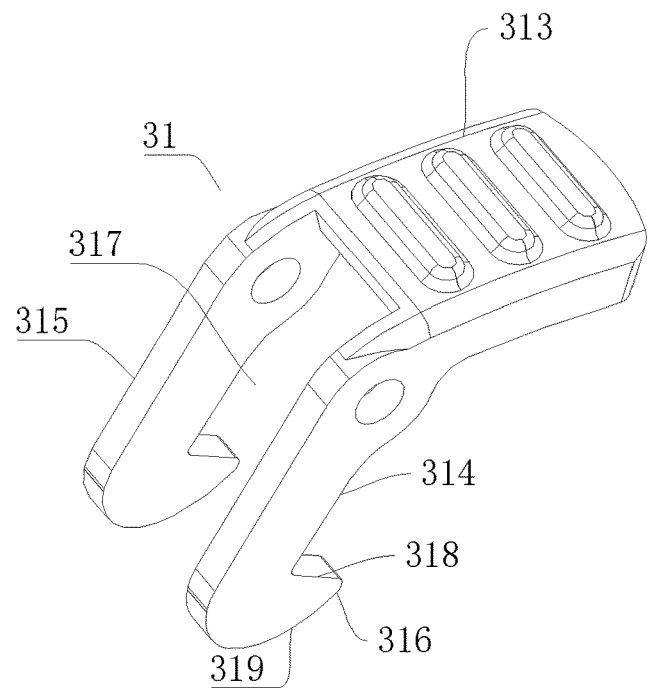
FIG. 7 is a schematic view of a swinging member of FIG. 4.

In order to ensure structural stability when the swinging member 31 locks the support rod 20, in this embodiment, as shown in FIG. 4 and FIG. 7, the co-operation part 312 of the swinging member 31 is provided with an open slot 317 for avoiding the support rod 20, thereby forming two locking arms 315 for locking the support rod 20. The two locking arms 315 are located at two opposite sides of the connecting seat 23, respectively.

In order to ensure stable movement of the locking arm 315 within the mounting groove 15, referring to one of the embodiments, the locking arm 315 is in clearance fit with a side wall of the mounting groove 15 and a side face of the support rod 20. Of course, in order to ensure a more stable fit between the locking arm 315 and the connecting seat 23, in other embodiments, the locking arm 315 is attached to a corresponding side of the connecting seat 23 and is in a clearance fit with a corresponding side wall of the mounting groove 15. Furthermore, two opposite sides of the connecting seat 23 are provided with mating planes, and each locking arm 315 is attached to one corresponding mating plane to achieve surface contact between the locking arm 315 and the connecting seat 23.

In this embodiment, as shown in FIG. 4, FIG. 6 and FIG. 7, the support rod 20 has a locking block 25 protruding out from each lateral side thereof, and each locking arm 315 bends inwardly to form a locking hook 316 that matches with the locking block 25. Specifically, a line connecting a contact point of the locking hook 316 and locking block 25 and a hinge point of the support rod 20 is perpendicular to the hinge end 21 of the support rod 20, so as to prevent the locking mechanism 30 from unintentionally unlocking during rotation o the support rod 20.

In some embodiments, the locking block 25 and the locking hook 316 are respectively provided with a first locking surface 251 and a second locking surface 318 that contact with each other in the locking state, as well as a first arc transition surface 252 and a second arc transition surface 319 that connect the first locking surface 251 and the second locking surface 251, respectively. When the light reflective device 100 needs to be opened, the support rod 20 needs to be rotated reversely. Firstly, the two arc transition surfaces abut against each other, and the co-operation part 312 of the swinging part 31 can be pushed up until it reaches the two locking surfaces. This can automatically achieve fitting and locking without the need for manual operation of the swinging part 31.

Figure 8:
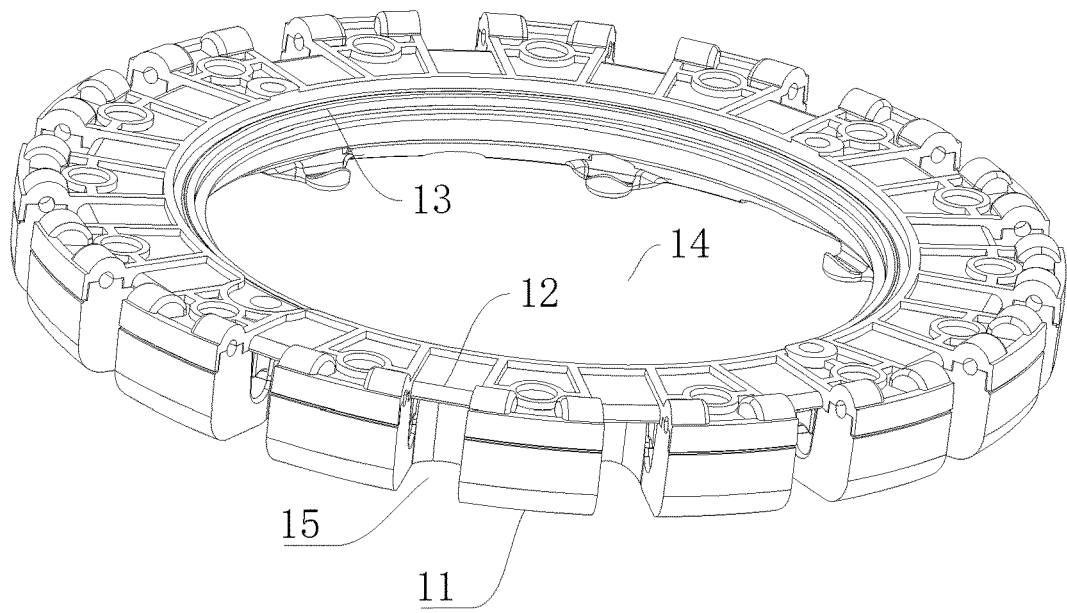
FIG. 8 is a schematic view of the chuck of FIG. 2.
Figure 9:
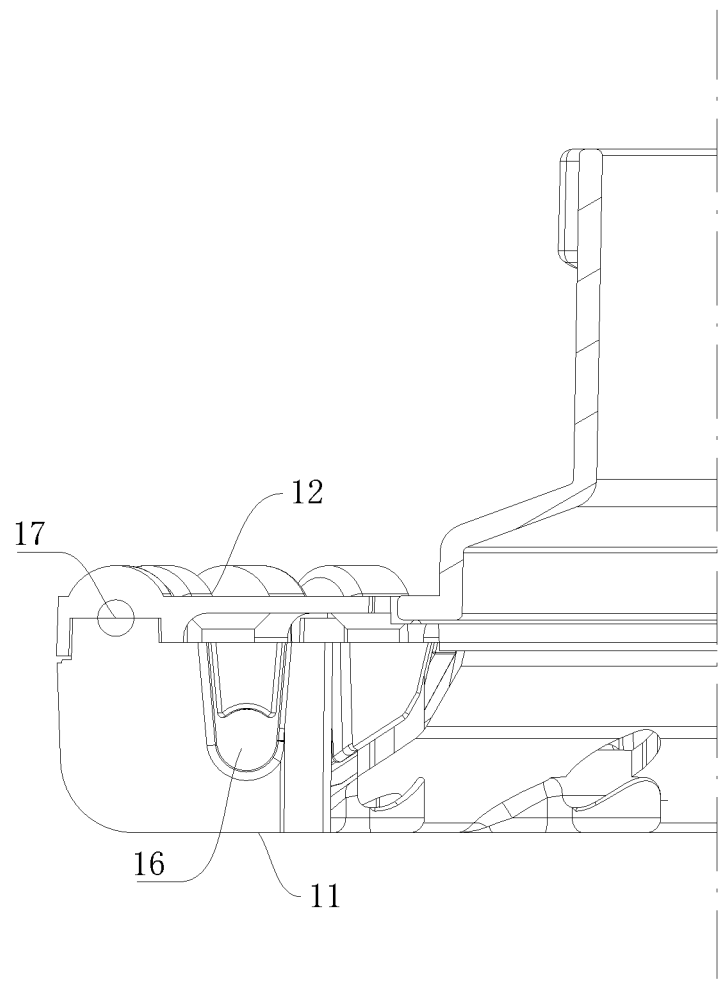
FIG. 9 is a partial cross-sectional view of the chuck of FIG. 2.
Figure 10:
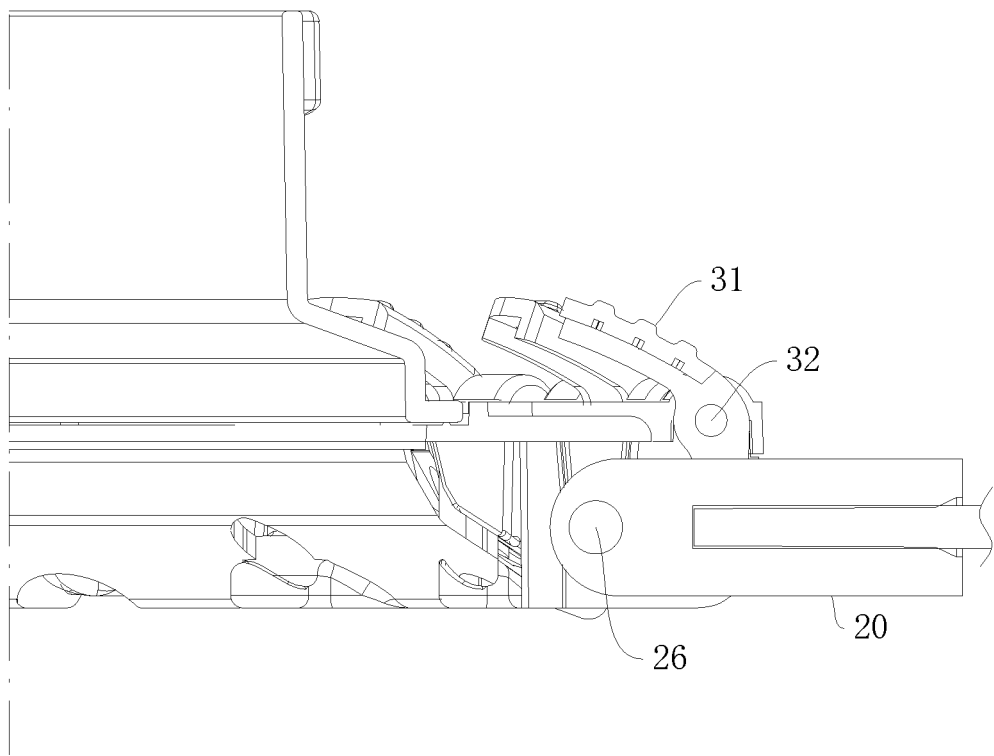
FIG. 10 is another partial cross-sectional view of the chuck of FIG. 2.

A specific configuration of the chuck 10 refers to one of the embodiments. As shown in FIG. 8, the chuck 10 includes a main body 11 and a cover body 12. The mounting groove 15 is formed at an outer periphery of the main body 11 and has two open sides. The cover body 12 is used to seal one of the two open sides of the mounting groove 15, so as to limit a moving path of the support rod 20. Among them, the swinging member 31 is hinged with the cover body 12.

Specifically, the chuck 10 is annular, with an axial direction and a radial direction perpendicular to the axial direction. The main body 11 and the cover body 12 are both annular, and the cover body 12 and the main body 11 are attached and fixed to each other in the axial direction of the chuck 10.

In some embodiments, as shown in FIG. 4, the connecting seat 23 is provided with a first shaft 26. The first shaft 26 and the connecting seat 23 are formed integrally or separately. The swinging member 31 is provided with a second shaft 32, which is formed integrally or separately with the swinging member 31. The cover body 12 and the main body 11 are connected to each other by snap-fit, and cooperatively define a first slot 16 matching with the first shaft 26 and a second slot 17 matching with the second shaft 32.

During assembly of the light reflective device 100, firstly, the connecting seat 23 and the swinging member 31 are pre-assembled at predetermined positions of the main body 11, and then the first shaft 26 and second shaft 32 are respectively restricted in corresponding first slot 16 and second slot 17 by the cover body 12, thereby achieving the aim of facilitating the assembly of the aforementioned components.

According to the needs of the photoflood lamp, in some embodiments, as shown in FIG. 2 and FIG. 8, the light reflective device 100 further includes a Bowens-mount 50 through which the light reflective device 100 is connected to the photoflood lamp.

In order to facilitate the installation of the Bowens-mount 50 and the chuck 10, referring to one of the embodiments, the chuck 10 is provided with a positioning step 13, and an outer edge of the Bowens-mount 50 is placed on the positioning step 13, so as to quickly positon the installation positions of the Bowens-mount 50 and the chuck 10. An inner diameter of the main body 11 is less than an inner diameter of the cover body 12, so as to form the positioning step 13 between the cover body 12 and the main body 11.

Technical features of the above embodiments may be combined arbitrarily. To make the description concise, it does not describe all possible combinations of the technical features in the above embodiments. However, as long as the combinations of these technical features are not contradictory, they should be considered within the scope of this specification. When the technical features in different embodiments are shown in the same figure, it can be seen that this figure discloses an embodiment of a combination of the various embodiments.

The above embodiments only express several embodiments of the present application, which are described in details, but this cannot be understood as a limitation of the scope of the patent application. It should be pointed out that for those ordinary skilled in the art, any modifications and improvements made without departing from the spirit and principles of the present application should be within the scope of the present application.

What is claimed is:

1. A foldable light reflective device for photoflood lamp, comprising a chuck with a through hole defined in a central portion thereof, a plurality of support rods radially distributed around the chuck and a reflective cloth lined on the plurality of support rods; each of the plurality of support rods having one end being hinged with the chuck, and having an unfolded state to support the reflective cloth to form a cover structure and a folded state; a locking mechanism being provided between each of the plurality of support rods and the chuck for maintaining the support rod in the unfolded state, wherein the locking mechanism comprises:

a swinging member hinged with the chuck at a middle portion thereof, the swinging member being divided into an operation part and a co-operation part at a hinge point thereof, the co-operation part of the swinging member having a state of locking the support rod and a state of releasing the support rod; and a retaining member being configured for restricting the swinging member in the locking state;

wherein the support rod comprises a hinged end and a free end, a mounting groove is defined in an outer periphery of chuck and matches with the hinged end of the support rod, the co-operation part of the swinging member extends into the mounting groove to lock the support rod, and the operation part protrudes out from the chuck; and wherein the co-operation part of the swinging member is provided with an open slot for avoiding the support rod, and thus forms two locking arms for locking the support rod, wherein the locking arms are matched with a side wall of the mounting groove and a side face of the support rod in clearance fit.

2. The foldable light reflective device for photoflood lamp according to claim 1, wherein the support rod has a locking block protruding out from each lateral side thereof, and each locking arm bends inwardly to form a locking hook that matches with the locking block.

3. The foldable light reflective device for photoflood lamp according to claim 2, wherein the locking block and the locking hook are respectively provided with a first locking surface and a second locking surface that contact with each other in a locking state, as well as a first arc transition surface and a second arc transition surface that connect the first locking surface and the second locking surface, respectively.

4. The foldable light reflective device for photoflood lamp according to claim 3, wherein a line connecting a contact point between the locking hook and locking block and a hinge point of the support rod is perpendicular to the hinge end of the support rod.

5. The foldable light reflective device for photoflood lamp according to claim 1, wherein the chuck comprises a main body and a cover body, the mounting groove is formed at an outer periphery of the main body with two open sides, and the cover body is configured to seal one of the two open sides of the mounting groove.

6. The foldable light reflective device for photoflood lamp according to claim 1, wherein the operation part of the swinging member extends obliquely towards a geometric center of the chuck along a radial direction of the chuck.

7. The foldable light reflective device for photoflood lamp according to claim 1, wherein the retaining member is a torsion spring.

8. The foldable light reflective device for photoflood lamp according to claim 1, wherein the support rod comprises a connecting seat which is hinged with the chuck and acts as the hinged end of the support rod and a rod body; one end of the rod body is connected to the connecting seat by plug-in fit, and another end of the rod body extends along a direction away from the chuck and acts as the free end of the support rod; and the co-operation part of the swinging member cooperates with the connecting seat to lock the support rod.

9. The foldable light reflective device for photoflood lamp according to claim 8, wherein the connecting seat is provided with a first shaft; and the chuck comprises a main body and a cover body, wherein the cover body and the main body are connected to each other by snap-fit and cooperatively defines a first slot matching with the first shaft.

10. The foldable light reflective device for photoflood lamp according to claim 8, wherein the swinging member is provided with a second shaft; and the chuck comprises a main body and a cover body, wherein the cover body and the main body are connected to each other by snap-fit and cooperatively defines a second slot matching with the second shaft.

11. The foldable light reflective device for photoflood lamp according to claim 8, wherein two opposite sides of the connecting seat are provided with mating planes.

12. The foldable light reflective device for photoflood lamp according to claim 1, further comprising a Bowens-mount through which the light reflective device is connected to the photoflood lamp.

13. The foldable light reflective device for photoflood lamp according to claim 12, wherein the chuck is provided with a positioning step, and an outer edge of the Bowens-mount is placed on the positioning step.

14. A foldable light reflective device for photoflood lamp, comprising a chuck with a through hole defined in a central portion thereof, a plurality of support rods radially distributed around the chuck and a reflective cloth lined on the plurality of support rods;
   each of the plurality of support rods having one end being hinged with the chuck, and having an unfolded state to support the reflective cloth to form a cover structure and a folded state;
   a locking mechanism being provided between each of the plurality of support rods and the chuck for maintaining the support rod in the unfolded state, wherein the locking mechanism comprises:
   a swinging member hinged with the chuck at a middle portion thereof, the swinging member being divided into an operation part and a co-operation part at a hinge point thereof, the operation part of the swinging member extending obliquely and upwardly from the hinge point towards a central axis of the chuck, and the co-operation part of the swinging member having a state of locking the support rod and a state of releasing the support rod; and
   a retaining member being configured for restricting the swinging member in the locking state.

15. The foldable light reflective device for photoflood lamp according to claim 14, wherein the co-operation part of the swinging member comprises a locking arm, a distal end of the locking arm bends inwardly to form a locking hook; and, the support rob comprises a locking block protruding out from a lateral side thereof, and the locking block matches with the locking hook;
   when the co-operation part of the swinging member in the state of locking the support rod, the locking hook is engaged with the locking block; and
   when the co-operation part of the swinging member in the state of releasing the support rod, the locking hook is disengaged from the locking block.

16. A foldable light reflective device for photoflood lamp, comprising a chuck with a through hole defined in a central portion thereof, a plurality of support rods radially distributed around the chuck and a reflective cloth lined on the plurality of support rods;
   each of the plurality of support rods having one end being hinged with the chuck, a locking block protruding out from a lateral side of the one end of each of the plurality of support rods; and
   a locking mechanism being provided between each of the plurality of support rods and the chuck, wherein the locking mechanism comprises:
   a swinging member hinged with the chuck at a middle portion thereof, the swinging member being divided into an operation part and a co-operation part at a hinge point thereof, the co-operation part of the swinging member comprising a locking hook, the locking hook having a locking state engaged with the locking block and a releasing state disengaged from the locking block; and
   a retaining member being configured for restricting the locking hook of the swinging member in the locking state.

17. The foldable light reflective device for photoflood lamp according to claim 16, wherein the locking hook comprises a first locking surface and a first latching surface which are angled with each other, and the locking block comprises a second locking surface and a second latching surface which are angled with each other, and, wherein
   when the locking hook of the swinging member in the locking state, the first locking surface abuts the second locking surface to limit a motion of the support rod in the axial direction, and the first latching surface abuts the second latching surface to limit a motion of the support rod in the radial direction, so as to lock the support rod in a unfolded state to support the reflective cloth thereon.

18. The foldable light reflective device for photoflood lamp according to claim 16, wherein the co-operation part of the swinging member is provided with an open slot for extending of the one end of the support rod therethrough, and thus forms two of the locking arms at two opposite sides of the open slot, respectively; and, wherein two of the locking blocks protrude out from opposite lateral sides of the one end of the support rod, respectively.

* * * * *